United States Patent
Lee

(10) Patent No.: US 11,643,042 B2
(45) Date of Patent: May 9, 2023

(54) VEHICLE CRASH PAD

(71) Applicant: HYUNDAI MOBIS Co., Ltd., Seoul (KR)

(72) Inventor: Min Kyeong Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/498,984

(22) Filed: Oct. 12, 2021

(65) Prior Publication Data

US 2022/0111816 A1    Apr. 14, 2022

(30) Foreign Application Priority Data

Oct. 12, 2020 (KR) .......................... 10-2020-0131346
Oct. 12, 2020 (KR) .......................... 10-2020-0131347
Oct. 12, 2020 (KR) .......................... 10-2020-0131348

(51) Int. Cl.
  *B60R 21/2165*   (2011.01)
  *B60R 21/04*     (2006.01)
  *B60R 21/207*    (2006.01)

(52) U.S. Cl.
  CPC .......... *B60R 21/2165* (2013.01); *B60R 21/04* (2013.01); *B60R 21/207* (2013.01)

(58) Field of Classification Search
  CPC ... B60R 21/2165; B60R 21/04; B60R 21/207; B60R 2021/2161; B60R 21/205
  See application file for complete search history.

(56) References Cited

U.S. PATENT DOCUMENTS

| | | | | |
|---|---|---|---|---|
| 6,079,733 A | * | 6/2000 | Towler | B60R 21/216 280/728.2 |
| 7,673,896 B2 | * | 3/2010 | Yamada | B60R 21/2165 280/732 |
| 8,480,121 B2 | * | 7/2013 | Horibe | B60R 21/205 280/732 |
| 8,844,965 B2 | | 9/2014 | Wisniewski et al. | |
| 9,045,107 B2 | * | 6/2015 | Kim | B60R 21/2165 |
| 9,126,559 B2 | * | 9/2015 | Ito | B26D 3/06 |
| 9,260,074 B2 | * | 2/2016 | Fujita | B60R 21/2165 |
| 9,421,938 B2 | | 8/2016 | Barr et al. | |
| 9,481,338 B2 | * | 11/2016 | Mazur | B29C 44/06 |
| 9,771,044 B1 | | 9/2017 | Patnala et al. | |
| 9,821,748 B2 | * | 11/2017 | Takahashi | B60R 21/2165 |
| 10,081,327 B2 | * | 9/2018 | Toda | B60R 21/2165 |

(Continued)

FOREIGN PATENT DOCUMENTS

| | | |
|---|---|---|
| DE | 102 44 311 A1 | 4/2004 |
| DE | 20 2019 000 280 U1 | 3/2019 |

(Continued)

*Primary Examiner* — Paul N Dickson
*Assistant Examiner* — Tiffany L Webb
(74) *Attorney, Agent, or Firm* — NSIP Law

(57) ABSTRACT

There is provided a vehicle crash pad coupled to a passenger airbag door having a passenger airbag installed in a passenger seat direction, the vehicle crash pad including a base forming a frame, a scrim coupled to an inside of the base of the passenger airbag door in an insert-injection method, a skin disposed above the base portion and having a surface exposed to an outside, a foam disposed between the base and the skin, and X shaped incision grooves formed in a rear surface of the base in an area of the passenger airbag door.

17 Claims, 11 Drawing Sheets

310: 311, 312, 313, 314
320: 321, 322, 323, 324

(56) References Cited

U.S. PATENT DOCUMENTS

| | | | | |
|---|---|---|---|---|
| 2018/0222430 A1* | 8/2018 | Totani | ..................... | B32B 27/12 |
| 2019/0225182 A1* | 7/2019 | Lee | ....................... | B60R 21/205 |
| 2021/0155193 A1* | 5/2021 | Moriizumi | ............. | B60K 37/00 |

FOREIGN PATENT DOCUMENTS

| | | |
|---|---|---|
| EP | 1 393 994 A1 | 3/2004 |
| EP | 2 801 500 A1 | 11/2014 |
| EP | 3 034 361 A1 | 6/2016 |

\* cited by examiner

310: 311, 312, 313, 314

310: 311, 312, 313, 314
320: 321, 322, 323, 324

PRIOR ART

310: 311, 312, 313, 314
330: 331, 332, 333

310: 311, 312, 313

310: 311, 312, 313, 314
320: 321, 322, 323, 324
330: 331, 332, 333

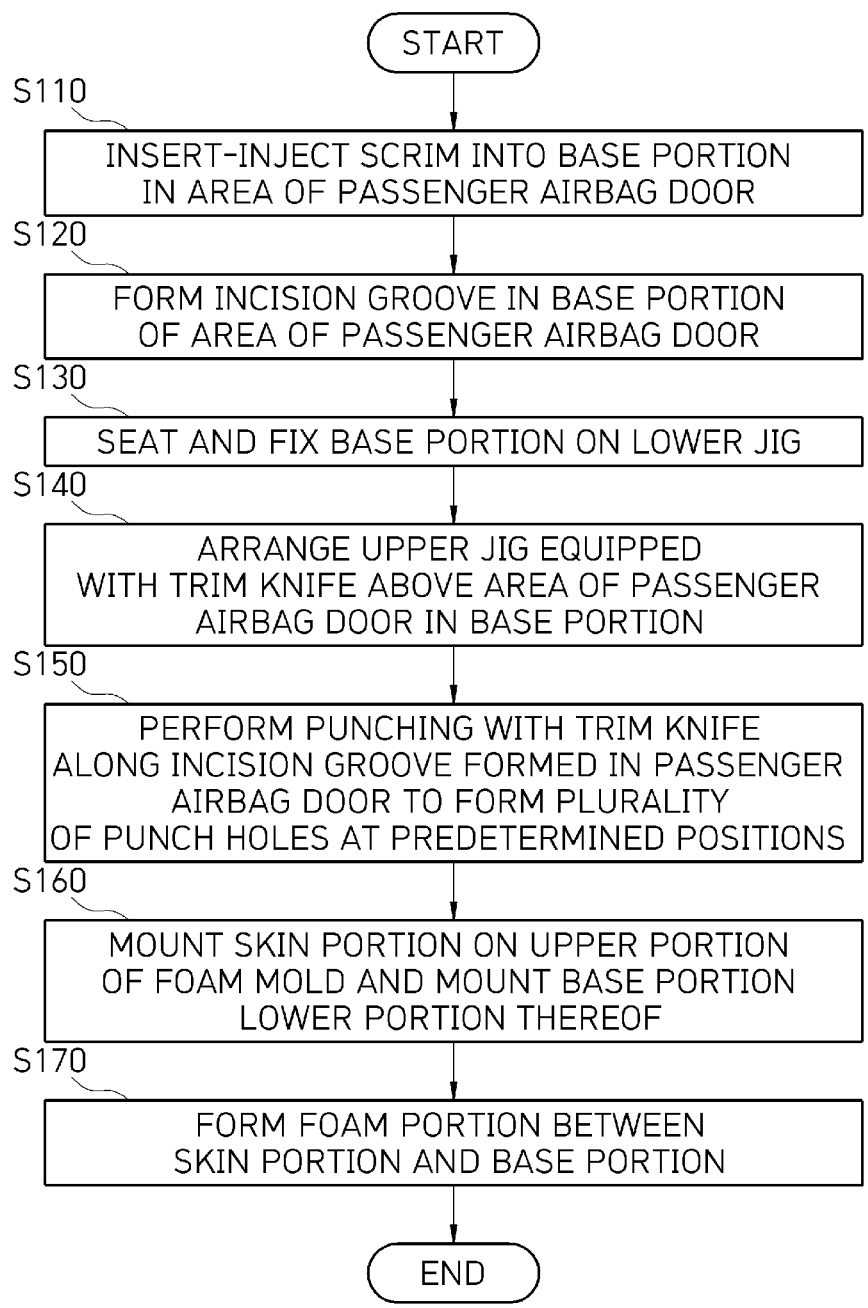

VEHICLE CRASH PAD

CROSS-REFERENCE TO RELATED APPLICATION

This application claims the benefit under 35 USC § 119(a) of Korean Patent Applications No. 10-2020-0131346, filed on Oct. 12, 2020, No. 10-2020-0131347, filed on Oct. 12, 2020 and No. 10-2020-0131348, filed on Oct. 12, 2020 in the Korean Intellectual Property Office, the entire disclosure of which is incorporated herein by reference for all purposes.

BACKGROUND

1. Field of the Invention

The present invention relates to a vehicle crash pad in which a deployment line formed on a passenger airbag door is damaged by a deployment pressure of the airbag to facilitate the deployment of the airbag.

2. Discussion of Related Art

Generally, a vehicle crash pad (crash pad) is an interior part of a car and is mounted at a lower end portion in front of a driver's seat. Moreover, the vehicle crash pad is designed to accommodate an instrument panel that integrates instruments such as a speedometer, a fuel gauge, and a water temperature gauge, an air conditioner, a radio, a clock, an ashtray, and a small item.

In addition, the crash pad accommodates airbags therein and is disposed in front of a driver's seat and a passenger's seat to minimize a force transmitted to a passenger from an external shock in an unexpected collision or rollover accident to reduce injuries, and thus, the crash pad is a very important part in terms of stability.

In particular, a passenger airbag (PAB) installed inside an airbag door formed at the passenger seat side of the crash pad protects safety of a passenger in the passenger seat in the event of a crash.

An incision groove is formed in a core and a skin on the crash pad corresponding to a rear surface of the airbag door through scoring.

The incision groove allows the airbag door to be easily damaged by the deployment pressure according to volume expansion of the passenger airbag when the vehicle collides.

Meanwhile, in the airbag door, a scrim made of a fabric material is inserted into the airbag door in order to prevent cracks between a rigid material and a soft material.

The airbag door is injection-molded with a rigid material and a soft material, wherein the rigid material forms a rigid loop and a rigid post, and the soft material forms a soft loop and a soft post.

Moreover, a point where the rigid material and the soft material meet is a boundary portion and is formed with the incision groove.

The scrim is inserted into the airbag door to prevent the incision groove from being cracked and broken while the vehicle travels to secure deployment robustness of the airbag door.

However, although robustness of the airbag door is secured due to the addition of the scrim to the airbag door, there is a problem in that the cost increases due to a unit cost of the scrim and investment in the scrim supply facility.

In addition, when the incision grooves are formed in the core and skin on the crash pad in an in-mold method, the unit cost and the investment cost for supply equipment can be reduced by scoring. However, when a thickness of foam disposed on the upper portion of the crash pad is small, a structure of an in-mold hole protrudes from the exterior of the airbag door.

For this reason, there is a problem in that an appearance quality of the airbag door is degraded due to the in-mold hole in the related art.

In addition, in the in-mold method, a resin can only flow through a bridge between holes even in a resin flow during the molding of the crash pad, and thus, there is a limitation in the molding of the crash pad.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a vehicle crash pad coupled to a passenger airbag door having a passenger airbag installed in a passenger seat direction, the vehicle crash pad including a base forming a frame, a scrim coupled to an inside of the base of the passenger airbag door in an insert-injection method, a skin disposed above the base portion and having a surface exposed to an outside, a foam disposed between the base and the skin, and incision grooves formed in a rear surface of the base in an area of the passenger airbag door.

The base may be made of any one or any combination of polypropylene and polyurethane.

An incision groove of the incision grooves may be formed in a surface of the base in a direction in which the passenger airbag is disposed in the area of the passenger airbag door.

The incision groove may be configured to allow the passenger airbag door to be broken by a deployment pressure of the passenger airbag, in response to the passenger airbag being deployed.

The incision grooves may include a first incision line extending in a width direction of the base formed in the area of the passenger airbag door, second incision lines extending in a vertical direction from both ends of the first incision line, third incision lines extending from both ends of the second incision lines toward each corner of the passenger airbag door, and fourth incision lines extending in a vertical direction and a horizontal direction from an end of the third incision lines to connect ends of the third incision lines to each other.

A length of the second incision line may be smaller than lengths of the first incision line and the third incision line.

In response to the passenger airbag being deployed, the first incision line, the second incision lines, the third incision lines, and the fourth incision lines may be broken by a deployment pressure of the passenger airbag, and the passenger airbag may be deployed between the first incision line, the second incision lines, and the third incision lines.

A thickness of the foam may be in a range of 4 mm to 5 mm.

The incision grooves may be X shaped.

In another general aspect, there is provided a vehicle crash pad coupled to a passenger airbag door having a passenger airbag installed in a passenger seat direction, the vehicle crash pad including a base forming a frame, and a scrim coupled to an inside of the base of the passenger airbag door in an insert-injection method, and incision grooves formed in a rear surface of the base in an area of the passenger airbag door, wherein the scrim comprises a first breaking hole formed in a width direction of the passenger airbag door, and a second breaking hole bent in a vertical direction and a horizontal direction in a corner area of the passenger airbag door.

The incision grooves may include a first incision line extending in a width direction of the base formed in the area of the passenger airbag door, third incision lines extending toward each corner of the passenger airbag door, and fourth incision lines extending in the vertical direction and the horizontal direction from an end of the third incision line to connect ends of the third incision lines to each other, wherein the first breaking hole is formed at a position corresponding to the first incision line, and the second breaking hole is formed at a position corresponding to the fourth incision lines.

The scrim may be broken along the first breaking hole and the second breaking hole, in response to the passenger airbag being deployed.

In another general aspect, there is provided a vehicle crash pad coupled to a passenger airbag door having a passenger airbag installed in a passenger seat direction, the vehicle crash pad including a base forming a frame, and a scrim coupled to an inside of the base of the passenger airbag door in an insert-injection method, wherein X shaped incision grooves are formed in a rear surface of the base in an area of the passenger airbag door, and the incision grooves comprise a first incision line extending in a width direction of the base portion formed in the area of the passenger airbag door, third incision lines extending from both ends of the first incision line toward each corner of the passenger airbag door, and fourth incision lines extending in a vertical direction and a horizontal direction from an end of the third incision lines to connect ends of the third incision lines to each other.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a partial bottom view illustrating a bottom surface of a passenger airbag door of the vehicle crash pad according to one embodiment of the present invention;

FIG. 12 is a flowchart illustrating a method of manufacturing the vehicle crash pad according to another embodiment of the present invention; and FIG. 13A

Figure 1:
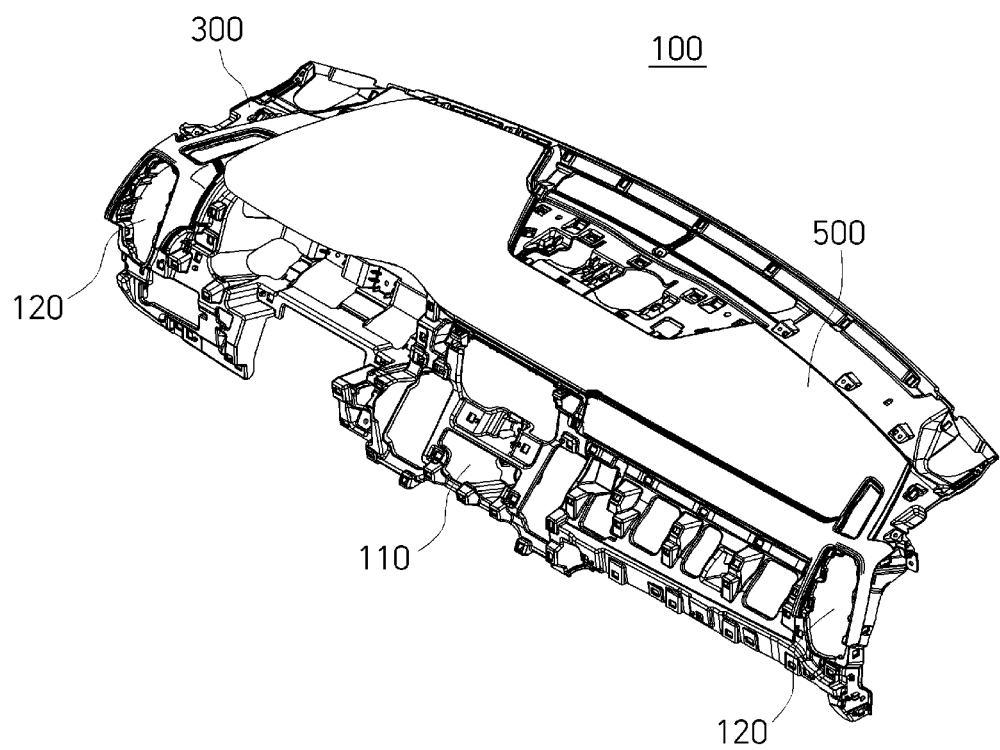
FIG. 1 is a perspective view illustrating a vehicle crash pad according to one embodiment of the present invention.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Hereinafter, exemplary embodiments of the present invention will be described in detail with reference to the accompanying drawings.

Figure 2:
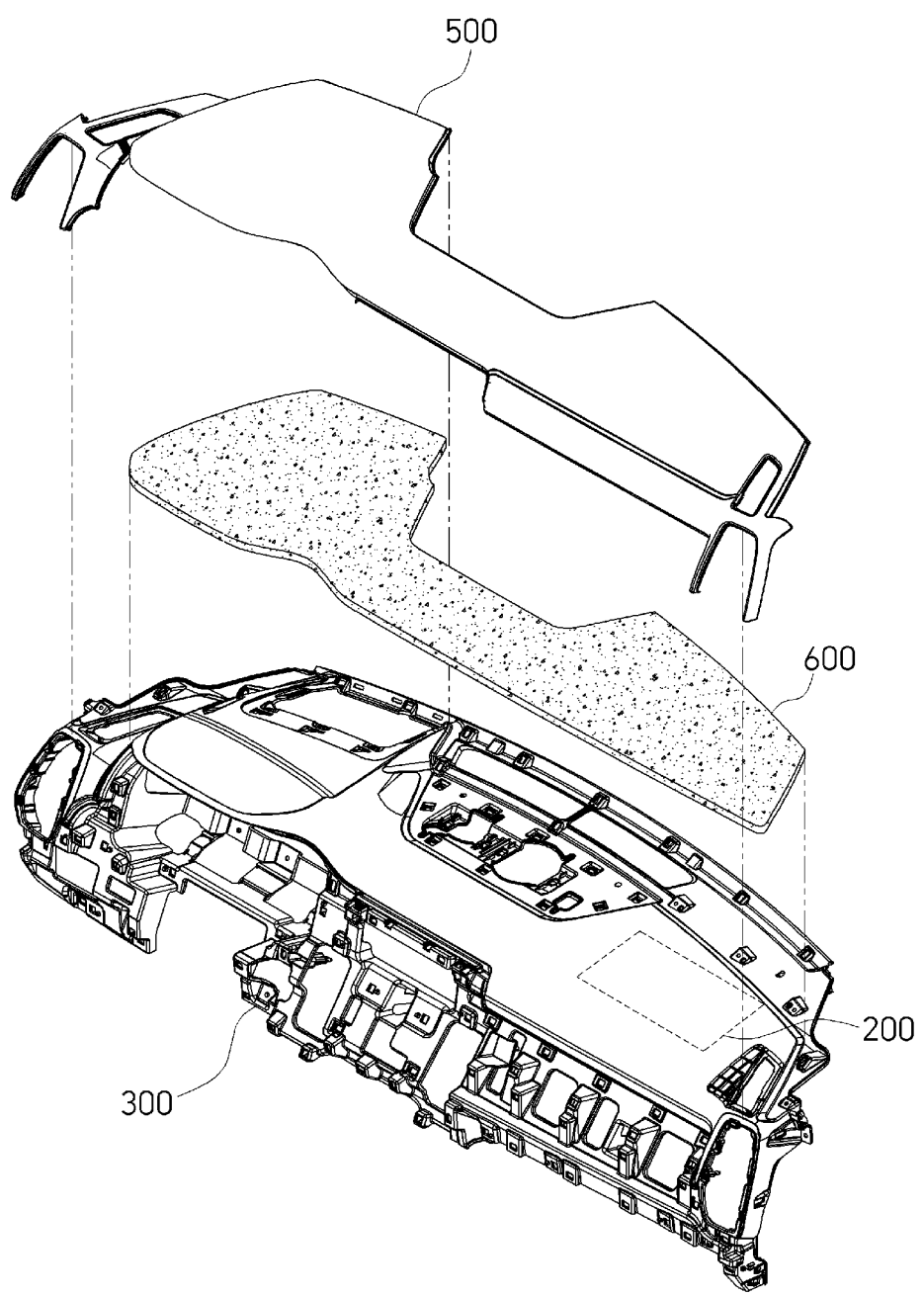
FIG. 2 is an exploded perspective view of the vehicle crash pad according to one embodiment of the present invention.
Figure 3A:
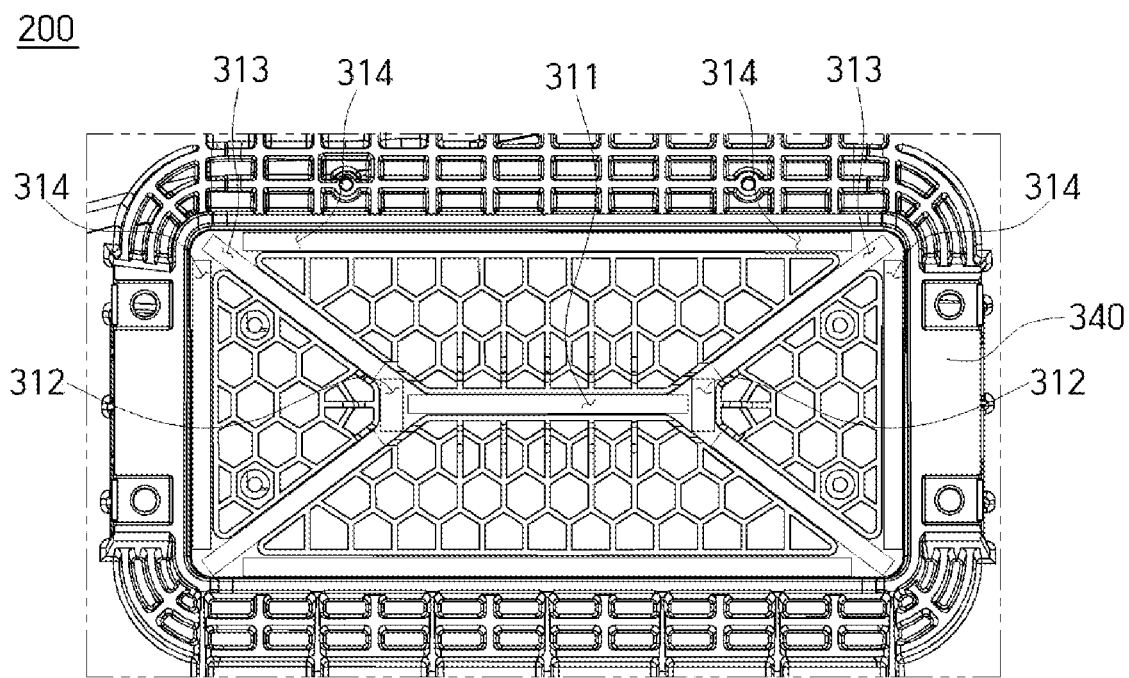
FIG. 3A is a partial bottom view illustrating a bottom surface of a passenger airbag door of the vehicle crash pad according to another embodiment of the present invention.
Figure 4:
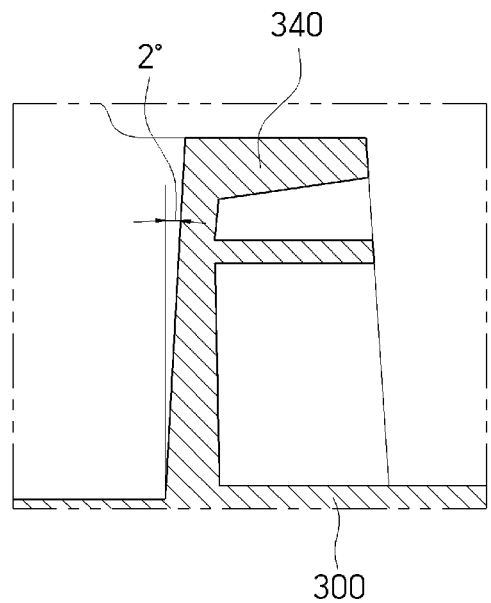
FIG. 4 is a cross-sectional view illustrating an extension portion of the vehicle crash pad according to one embodiment of the present invention.
Figure 5:
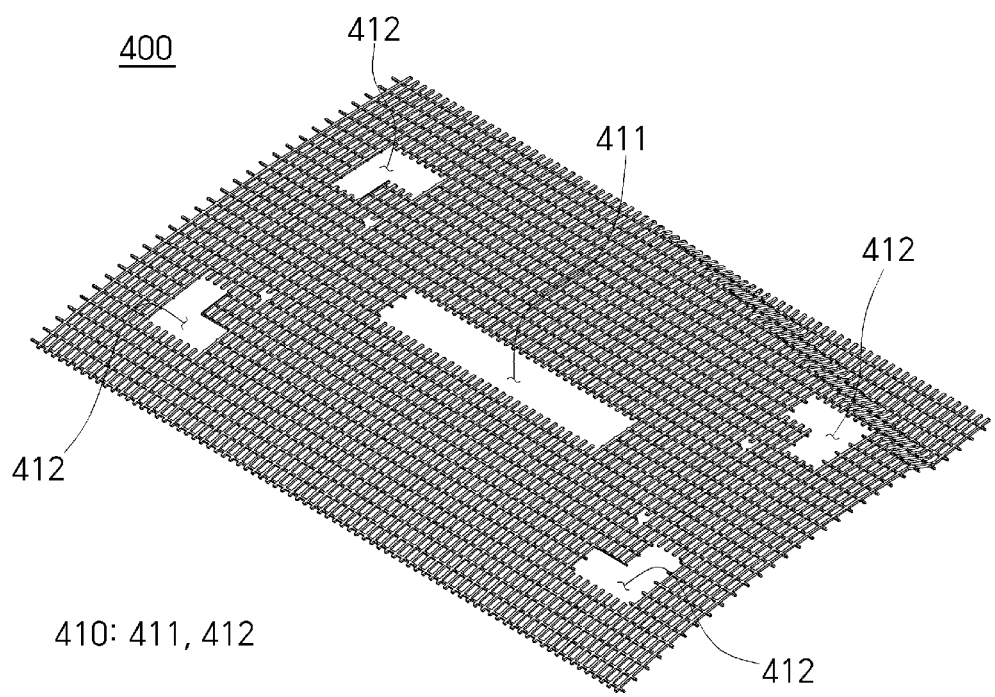
FIG. 5 is a perspective view illustrating a scrim of the vehicle crash pad according to one embodiment of the present invention.

FIG. 1 is a perspective view illustrating a vehicle crash pad according to one embodiment of the present invention, FIG. 2 is an exploded perspective view of the vehicle crash pad according to one embodiment of the present invention, FIG. 3 is a partial bottom view illustrating a bottom surface of a passenger airbag door of the vehicle crash pad according to one embodiment of the present invention, FIG. 4 is a cross-sectional view illustrating an extension portion of the vehicle crash pad according to one embodiment of the present invention, and FIG. 5 is a perspective view illustrating a scrim of the vehicle crash pad according to one embodiment of the present invention.

Referring to FIGS. 1 to 5, a crash pad 100 has rigidity to protect a passenger in a vehicle interior from an external impact, and a button insertion hole 110 into which a device such as an air conditioner and a control button for operating the device are inserted, a vent insertion hole 120 in which an air vent is mounted, and an airbag module insertion hole (not illustrated) in which an airbag is mounted may be formed in the crash pad 100.

In addition, a passenger airbag door 200 is integrally coupled to the vehicle crash pad 100 in a passenger seat direction, and a passenger airbag is installed inside the passenger airbag door 200.

As illustrated in FIG. 2, the vehicle crash pad 100 includes a base portion 300, a scrim 400, a skin portion 500, and a foam portion 600.

The base portion 300 constitutes a frame of the vehicle crash pad 100, forms portions in front of a driver's seat and a passenger's seat, and has rigidity to protect a passenger in a vehicle interior from external impacts during vehicle crashes and rollover accidents.

In addition, the base portion 300 is formed in a non-planar three-dimensional shape having a curved surface, a bent surface, an uneven surface, or the like in order to reduce injury of an occupant due to a collision and provide a beautiful exterior.

The base portion 300 is made of polypropylene, polyurethane, or a combination thereof.

In addition, the base portion 300 may be made of a material such as wood or a metal.

The base portion 300 includes an incision groove 310 and an extension portion 340.

The incision groove 310 is formed in an area in which the passenger airbag is disposed so that the skin portion 500 and the foam portion 600 that are not scored are smoothly deployed when the passenger airbag door 200 is deployed, that is, the incision groove 310 is formed in the passenger airbag door 200.

Specifically, as illustrated in FIG. 2, the incision groove 310 is formed in a rear surface of the base portion 300 of the airbag door area, that is, a surface behind which the passenger airbag is disposed.

The incision groove 310 has a thickness that is smaller than a thickness of the passenger airbag door 200.

That is, the incision groove 310 is formed in a groove shape without passing through the passenger airbag door 200.

The incision groove 310 allows the passenger airbag door 200 to be easily broken along the incision groove 310 by a deployment pressure according to the deployment of the passenger airbag when the passenger airbag is deployed due to a car crash.

That is, when the base portion 300 is inflated by the passenger airbag, the base portion is deployed along the incision groove 310.

As illustrated in FIG. 3, the incision groove 310 includes a first incision line 311, second incision lines 312, third incision lines 313, and fourth incision lines 314.

The first incision line 311 extends in a width direction from the base portion 300 formed in the area of the passenger airbag door 200.

The second incision lines 312 extend in an up-down direction from both ends of the first incision line 311 in the base portion 300 formed in the area of the passenger airbag door 200.

A length of the second incision line 312 is smaller than lengths of the first incision line 311 and the third incision line 313.

The third incision lines 313 extend from both ends of the second incision line 312 toward each corner of the passenger airbag door 200 in the base portion 300 formed in the area of the passenger airbag door 200.

That is, in the incision groove 310, when the passenger airbag is deployed, the passenger airbag door 200 is broken in an overall X shape due to the third incision lines 313.

The fourth incision lines 314 connect the ends of the third incision line 313 extending toward the corner of the passenger airbag door 200.

That is, the fourth incision lines 314 extend in the vertical and horizontal directions to form an outer frame of the passenger airbag door 200.

Therefore, when the passenger airbag is deployed, the first incision line 311, the second incision lines, and the third incision lines 313 are broken by the deployment pressure of the passenger airbag, and the passenger airbag is deployed between the first incision line 311, the second incision line 312, and the third incision line 313.

Moreover, due to the X shape of the incision grooves 310, when the passenger airbag is deployed from the airbag door, the skin portion 500 is pulled in three directions while the incision groove 310 of the base portion 300 is broken in an X shape.

Therefore, due to the X-shaped incision grooves 310 formed in the base portion 300, the skin portion 500 and the foam portion 600 are easily torn by a shearing force caused by damages of the airbag door even when the skin portion 500 and the foam portion 600 are not separately scored.

Accordingly, the X-shaped incision grooves 310 formed in the base portion 300 can significantly shorten a deployment time of the passenger airbag.

Meanwhile, in an incision groove according to another embodiment of the present invention, the second incision lines 312 may be omitted.

Hereinafter, an incision groove 310 according to another embodiment of the present invention will be described.

The incision groove 310 according to another embodiment of the present invention includes a first incision line 311, third incision lines 313, and fourth incision lines 314.

The first incision line 311 extends in a width direction from the base portion 300 formed in the area of the passenger airbag door 200.

The third incision lines 313 extend from both ends of the first incision line 311 toward each corner of the passenger airbag door 200 in the base portion 300 formed in the area of the passenger airbag door 200.

That is, in the incision groove 310, when the passenger airbag is deployed, the passenger airbag door 200 is broken in an overall X shape due to the third incision lines 313.

The fourth incision lines 314 connect the ends of the third incision line 313 extending toward the corner of the passenger airbag door 200.

That is, the fourth incision lines 314 extend in the vertical and horizontal directions to form the outer frame of the passenger airbag door 200.

Accordingly, when the passenger airbag is deployed, the first incision line 311 and the third incision lines 313 are broken by the deployment pressure of the passenger airbag, and the passenger airbag is deployed between the first incision line 311 and the third incision line 313.

Therefore, in the incision groove 310 according to another embodiment of the present invention, the second incision line 312 disposed between the first incision line 311 and the third incision line 313 is omitted, and the first incision line 311 and the third incision line 313 are connected to each other. Accordingly, a distance between the pair of third incision lines 313 is shortened, and thus, when the passenger airbag door 200 is deployed, the skin portion 500 and the foam portion 600 may be torn relatively cleanly.

In addition, in the incision groove 310 according to another embodiment of the present invention, the second incision line 312 of one embodiment is omitted. Accordingly, a manufacturing process for forming the second incision line 312 is reduced, and thus, a manufacturing cost and a manufacturing time of the incision groove 310 can be significantly reduced.

Meanwhile, the incision groove 310 may be cracked by repeated external impact caused by traveling of a vehicle or the like.

That is, when the incision groove 310 is cracked, the crack occurs in a situation in which the passenger airbag door 200 should not be deployed, and thus, there is a concern that the passenger airbag door 200 may be deployed.

Accordingly, the scrim 400 is coupled to the passenger airbag door 200 in order to improve a fixing force of the incision groove 310.

Referring to FIG. 4, the extension portion 340 extends in a rearward direction from a periphery of the area of the passenger airbag door 200.

That is, the extension portion 340 has a quadrangular frame shape in cross-section.

As described above, the passenger airbag is mounted inside the extension portion 340 having a quadrangular frame shape.

In addition, the extension portion 340 having the quadrangular frame shape extends in a state where an inner surface thereof is inclined by about 2° in an outward direction.

For this reason, the extension portion 340 allows the scrim 400 to be easily coupled to the base portion 300.

As illustrated in FIG. 5, the scrim 400 is made of a fabric material, and a plurality of warp and weft yarns cross each other up and down and are entangled in a lattice shape to form a net shape.

The size of the scrim 400 is determined according to the number of warp and weft yarns.

In addition, the scrim 400 is insert-injected and coupled to the base portion 300 of the area of the passenger airbag door 200.

Accordingly, the scrim 400 may firmly fix the base portion 300 in the area where the passenger airbag door 200 is disposed in a situation in which the passenger airbag door 200 should not be deployed.

That is, the scrim 400 may improve the robustness of the passenger airbag door 200.

A breaking hole 410 is formed in the scrim 400.

The breaking hole 410 is formed in the scrim 400 and formed by breaking the warp and weft yarns at positions corresponding to the incision grooves 310 of the base portion 300.

The breaking hole 410 includes a first breaking hole 411 and second breaking holes 412.

The first breaking hole 411 is formed in the scrim 400 in the width direction of the area of the passenger airbag door 200 to correspond to the first incision line 311.

A thickness of the first breaking hole 411 is the same as the length of the second incision line 312.

The second breaking holes 412 are each formed at the corners of the passenger airbag door 200 to correspond to the fourth incision line 314.

Each of the second breaking holes 412 is formed in a shape bent in the vertical direction and the horizontal direction in the corner areas of the passenger airbag door.

The breaking hole 410 induces breakage of the scrim 400 along the incision groove 310 when the passenger airbag is deployed.

That is, the scrim 400 firmly fixes the deployment of the passenger airbag door 200 in a situation in which the passenger airbag should not be deployed, and allows the passenger airbag door 200 to be easily deployed along the breaking hole 410 when the passenger airbag should be deployed.

Meanwhile, in one embodiment of the present invention, a separate scoring method is not applied to the base portion 300 and only the X-shaped incision grooves 310 are formed. However, in another embodiment of the present invention, a punch-scoring method may be applied along the X-shaped incision grooves 310 of the base portion 300 to form a punch hole 320 in the incision groove 310.

Hereinafter, the base portion 300 according to another embodiment of the present invention will be described with reference to the drawings.

Figure 6:
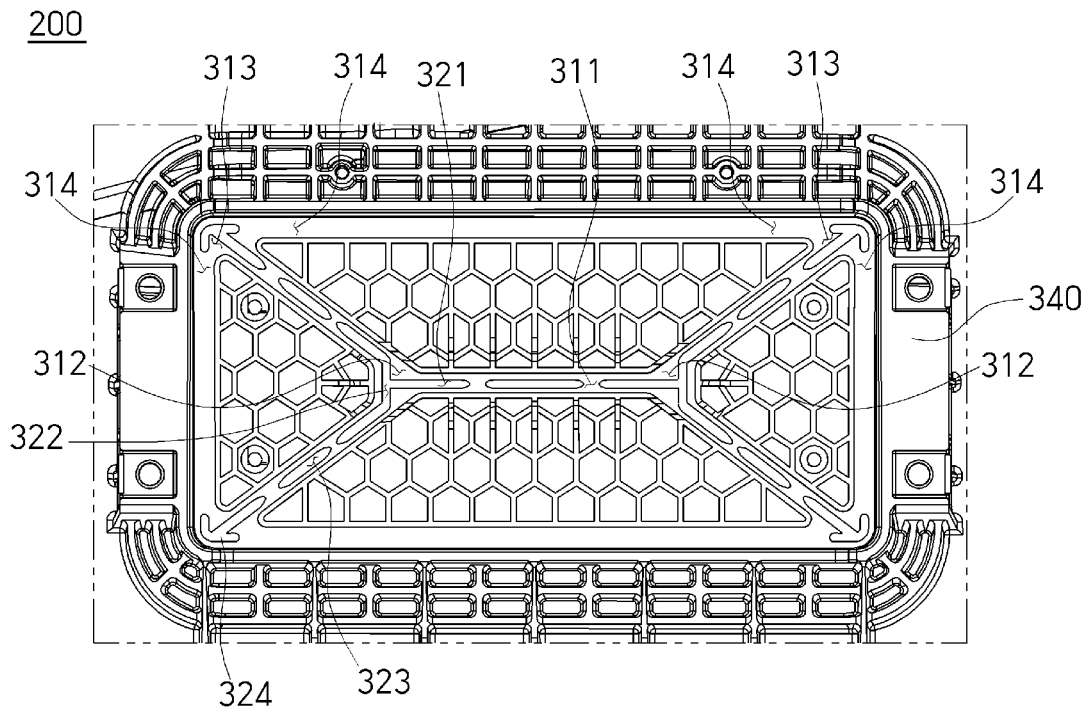
FIG. 6 is a partial bottom view illustrating a bottom surface of a passenger airbag door of a vehicle crash pad according to another embodiment of the present invention.
Figure 7A:
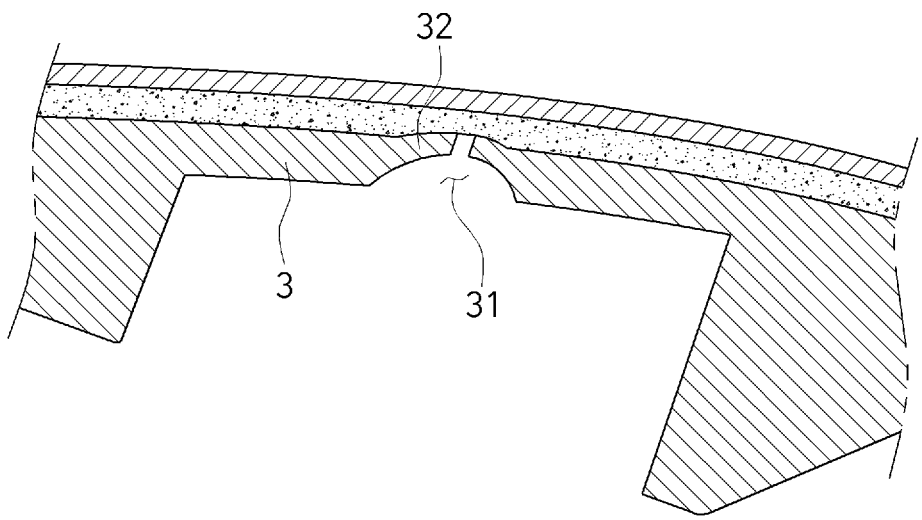
FIG. 7A and FIG. 7B is a comparative view illustrating a cross section of the vehicle crash pad according to another embodiment of the present invention and a cross section of a conventional crash pad.
Figure 7B:
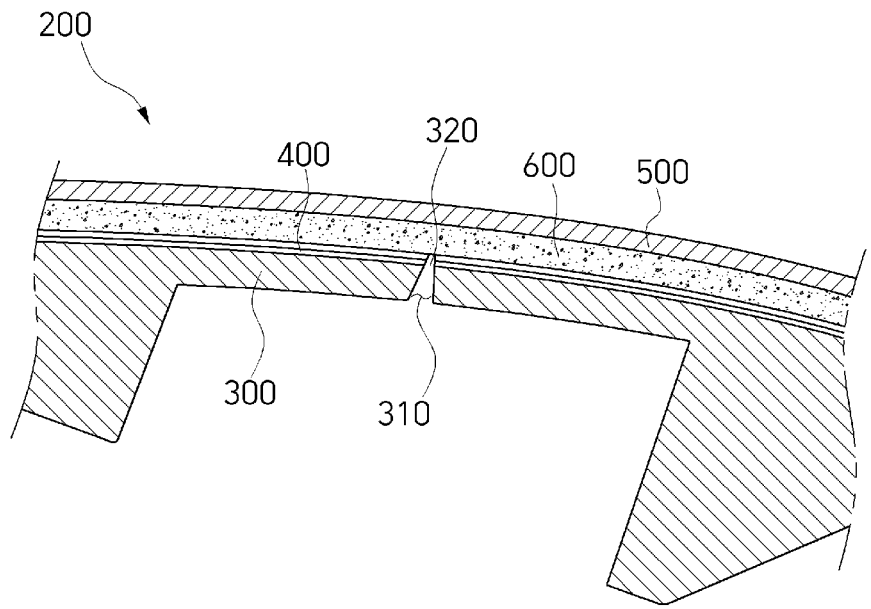

FIG. 6 is a partial bottom view illustrating a bottom surface of a passenger airbag door of a vehicle crash pad according to another embodiment of the present invention, and FIG. 7A and FIG. 7B is a comparative view illustrating a cross section of the vehicle crash pad according to another embodiment of the present invention and a cross section of a conventional crash pad.

The punch hole 320 is formed in the base portion 300 according to another embodiment of the present invention.

A plurality of punch holes 320 are formed along the incision groove 310 by applying the punch-scoring method to the incision groove 310.

The punch hole 320 allows the scrim 400 to be more easily broken along the incision groove 310 by the deployment pressure caused by the deployment of the passenger airbag when the passenger airbag is deployed due to a collision of a vehicle.

Meanwhile, as illustrated in FIG. 7A, in the related art, when an incision groove 31 is formed by an in-mold method, the convex part 32 is formed on the exterior of the base portion 3. However, as illustrated in FIG. 7B, the punch scoring has the advantage that when the punch hole 320 is formed in the base portion 300, a protrusion caused when forming the punch hole 320 does not protrude outward from the base portion 300.

When the punch hole 320 is formed in the base portion 300 by the punch scoring, as illustrated in FIG. 7B, the exterior of the base portion 300 does not protrude outward and is formed to be flat, and thus, it is possible to improve the quality of the exterior of the base portion 300.

In addition, since the exterior of the base portion 300 does not protrude, the quality of the exterior of the base portion 300 can be improved and a thickness of the foam portion 600 laminated on the exterior of the base portion 300 may be small.

Moreover, since the exterior of the base portion 300 does not protrude and is formed to be flat, a flow of a resin is smooth, and thus, when the scrim 400 is insert-injected into the base portion 300, the scrim 400 can be easily seated and a defective rate can be reduced.

The punch hole 320 includes a first punch line 321, a second punch line 322, a third punch line 323, and a fourth punch line 324.

Referring to FIG. 6, the first punch line 321 is provided as a plurality of first punch lines 321, which are formed at the position corresponding to the first incision line 311 and formed in the width direction of the base portion 300 formed in the area of the passenger airbag door 200 along the first incision line 311.

The second punch line 322 is formed at the position corresponding to the second incision line 312 and formed along the second incision line 312 in the up-down direction from both ends of the first punch line 321.

The third punch line 323 is formed at the position corresponding to the third incision line 313 and formed along the third incision line 313 from both ends of the second punch line 322 toward the corner of the passenger airbag door 200.

The fourth punch line 324 is formed at the position corresponding to the fourth incision line 314 and extends along the fourth incision line 314 in the vertical direction and horizontal direction from the end of the third punch line 323.

Moreover, a length of the fourth punch line 324 is formed smaller than the length of the third punch line 323.

The punch hole 320 is formed at a position corresponding to the incision groove 310 and thus has an overall X shape.

Accordingly, the incision groove 310 is fixed between the pair of fourth punch lines 324 formed in a left-right direction, and the incision groove 310 is fixed between the pair of fourth punch lines 324 formed in the up-down direction.

Specifically, in the passenger airbag door 200, when the passenger airbag is inflated and the incision groove 310 is broken, in FIG. 6, the incision groove 310 is fixed between the pair of fourth punch lines 324 formed on a right side and the pair of fourth punch lines 324 formed on a left side, and the incision groove 310 is fixed between the pair of fourth punch lines 324 formed an upper side and the pair of fourth punch lines 324 formed on a lower side.

For this reason, when the passenger airbag is deployed, the first punch line 321 to the fourth punch line are broken, and the passenger airbag is deployed between the first punch line 321, the second punch line 322, and the third punch line 323.

In addition, by eliminating the scoring process of the skin and the foam portion 600, it is possible to reduce costs.

Meanwhile, there is a problem in that it is difficult to apply a trim knife for forming the punch hole 320 using the punch-scoring method to a point where the incision grooves 310 intersect each other in the base portion 300.

To this end, in still another embodiment of the present invention, a plurality of through holes 330 are formed at the points where the plurality of incision grooves 310 intersect each other.

Here, the points at which the plurality of incision grooves 310 intersect each other include a point where the first incision line 311 and the second incision line 312 are connected to each other, a point where the second incision line 312 and the third incision line 313 are connected to each other, and a point where the third incision line 313 and the fourth incision line 314 are connected to each other.

In addition, the intersection points of the plurality of incision grooves 310 are formed in a curve.

Hereinafter, a base portion according to still another embodiment of the present invention will be described with reference to the drawings.

Figure 8:
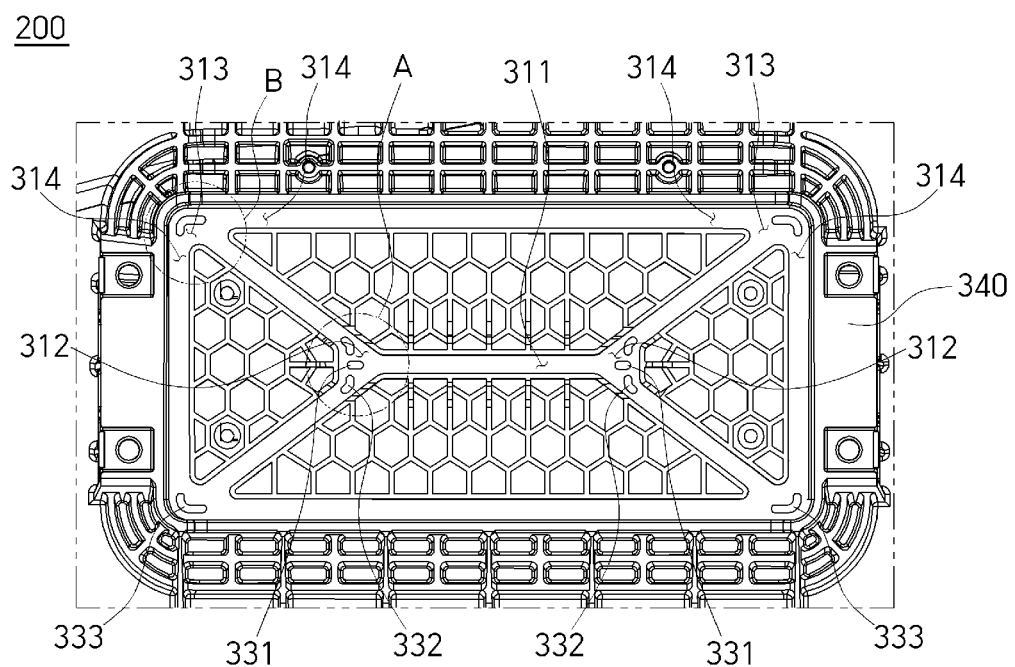
FIG. 8 is a partial bottom view illustrating a through hole of a passenger airbag door of a vehicle crash pad according to still another embodiment of the present invention.
Figure 9:
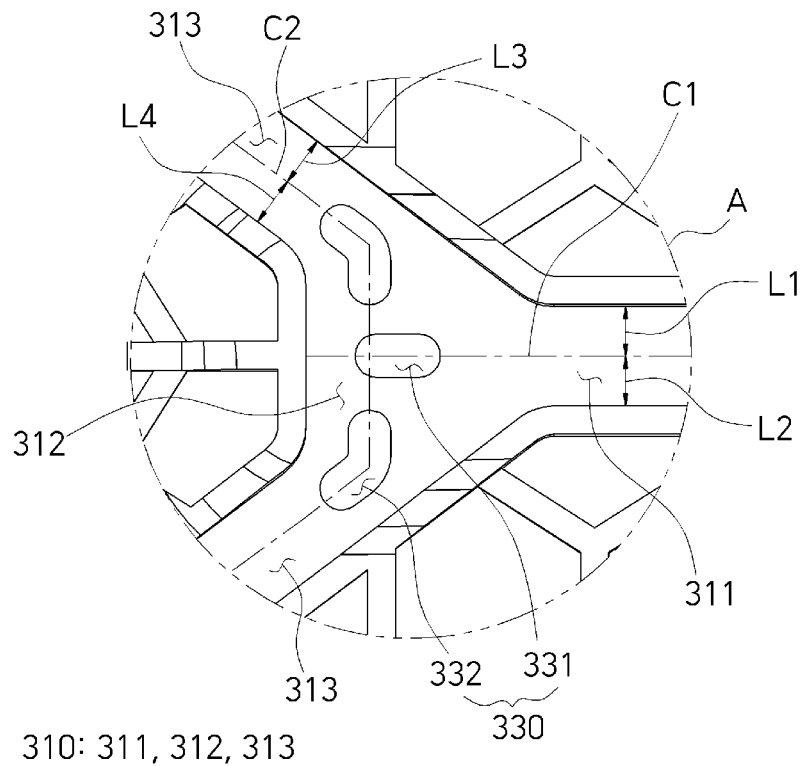
FIG. 9 is an enlarged view of an "A" portion illustrated in FIG. 8.
Figure 10:
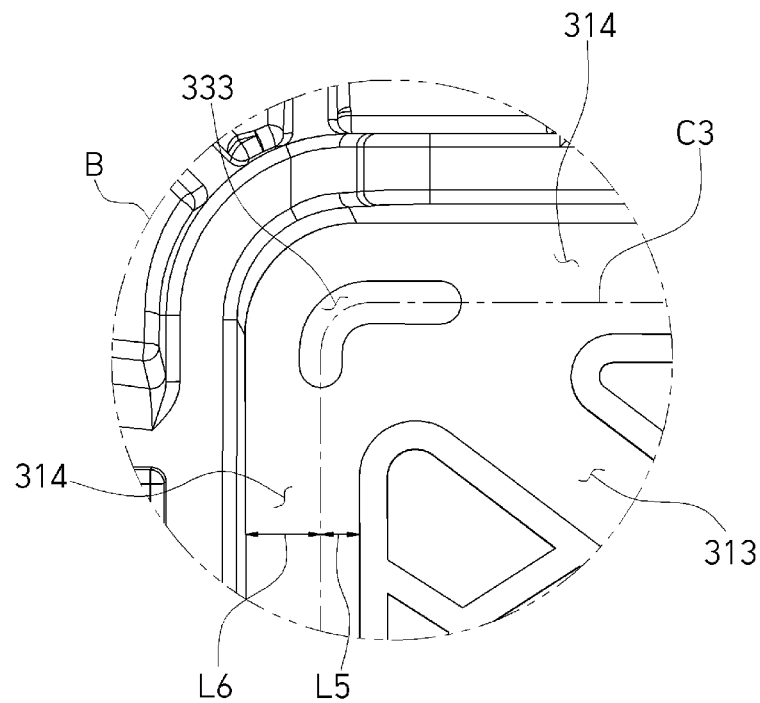
FIG. 10 is an enlarged view of a "B" portion illustrated in FIG. 8.

FIG. 8 is a partial bottom view illustrating a bottom surface of a passenger airbag door of a vehicle crash pad according to still another embodiment of the present invention, FIG. 9 is an enlarged view of an "A" portion illustrated in FIG. 8, and FIG. 10 is an enlarged view of a "B" portion illustrated in FIG. 8.

Referring to FIG. 8, a plurality of through holes 330 are formed at points where the plurality of incision grooves 310 intersect each other, and the punch hole 320 is formed in the remaining regions except for the plurality of through holes 330 through the punch scoring.

The plurality of through holes 330 include a first through hole 331, a second through hole 332, and a third through hole 333.

Referring to FIG. 9, the first through hole 331 is formed at the point where the first incision line 311 and the second incision line 312 are connected to each other.

The first through hole 331 is formed at a position at which a distance L1 between a central axis C1 thereof and one surface of the first incision line 311 is in the range of about 2.8 mm to 3.2 mm and a distance L2 between the central axis C1 and the other surface of the first incision line 311 is in the range of about 2.8 mm to 3.2 mm.

The second through hole 332 is formed at the point where the second incision line 312 and the third incision line 313 are connected to each other.

The second through hole 332 is formed at a position at which a distance L3 between a central axis C2 thereof, one surface of the second incision line 312 and one surface of the third incision line 313 is in the range of about 2.8 mm to 3.2 mm, and a distance L4 between the central axis C1, the other surface of the second incision line 312, and the other surface of the third incision line 313 is in the range of about 2.8 mm to 3.2 mm.

Referring to FIG. 10, the third through hole 333 is formed at the point where the third incision line 313 and the fourth incision line 314 are connected to each other.

The third through hole 333 is formed at a position at which a distance L5 between a central axis C3 thereof and one surface of the fourth incision line 314 is in the range of about 2.8 mm to 3.2 mm, and a distance L6 between the central axis C1 and the other surface of the fourth incision line 314 is in the range of about 3.8 mm to 4.2 mm.

Figure 11:
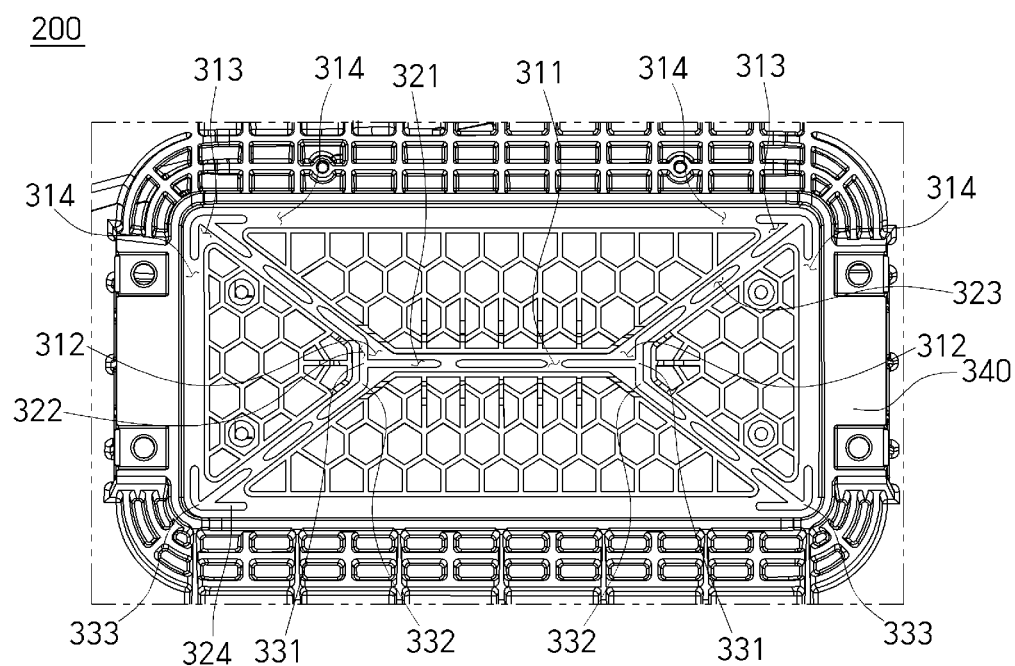
FIG. 11 is a partial bottom view illustrating a bottom surface of the passenger airbag door of the vehicle crash pad according to still another embodiment of the present invention.

Accordingly, as illustrated in FIG. 11, the first through hole 331 is formed between the first punch line 321 and the second punch line 322, and the second through hole 332 is formed between the second punch line 322 and the third punch line 323, and the third through hole 333 is formed between the third punch line 323 and the fourth punch line 324.

Therefore, the through hole 330 can obtain the same effects as those of the punch hole 320 at the point where the incision grooves 310 intersect each other in the base portion 300.

That is, when the passenger airbag is deployed, the passenger airbag door 200 may be more easily broken by the punch hole 320 and the through hole 330.

The plurality of through holes 330 are applied to the intersection points of the trim knife for the punch scoring in a modified X-shape and H-shape incision groove 310, as well as the X-shaped incision grooves 310 of the present invention, and in the remaining section, the punch hole 320 may be formed by applying punch scoring.

Meanwhile, when the punch hole 320 formed through the punch scoring is formed through the through hole 330, the resin flow is not smooth during injection of the crash pad 100, and thus, the defective rate of the base portion 300 increases, and it is difficult to seat the scrim 400. Accordingly, the through holes 330 are preferably formed only at the points where the plurality of incision grooves 310 intersect each other.

In addition, each of the plurality of through holes 330 and the plurality of punch lines has a width of about 1 mm.

Referring back to FIG. 2, the skin portion 500 according to one embodiment of the present invention is disposed above the base portion 300, has an exterior exposed to the outside, and is formed in a non-planar three-dimensional shape having a curved surface, an uneven surface, or the like to correspond to the exterior of the base portion 300.

Accordingly, the skin portion 500 can improve the quality of the interior of the vehicle.

The skin portion 500 smoothly forms the surface of the crash pad 100, unlike the base portion 300 having rigidity, so as to protect passengers in the vehicle interior from external impacts in the event of a vehicle collision or rollover accident.

Accordingly, the skin portion 500 may be easily torn by a breaking force of the incision groove 310 of the passenger airbag door 200 when the passenger airbag is deployed.

Moreover, the skin portion 500 is formed without going through a skin scoring process.

The skin portion 500 is easily torn by the incision groove 310 of the base portion 300 when the passenger airbag is deployed.

Through this, the process is simplified, costs such as material and part costs are reduced, and a thickness of the skin portion 500 is reduced so that weight of the crash pad 100 can be reduced.

The foam portion 600 is formed by injecting an undiluted foam solution (foam) injected between the base portion 300 and the skin portion 500, and absorbs the impact during a vehicle collision and rollover accident to minimize a force transmitted to the passenger, thereby reducing damage such as head injury of the passenger.

The foam portion 600 has a thickness ranging from 7 mm to 8 mm or from 4 mm to 5 mm and preferably has a thickness of 4 mm to 5 mm.

Meanwhile, when the punch scoring is applied to the incision groove 310 of the base portion 300, the exterior of the base portion 300 does not protrude, and thus, a separate curved surface is not formed even in the foam portion 600.

Accordingly, the thickness of the foam portion 600 can be reduced, and thus, the weight of the crash pad 100 can be reduced.

As described above, according to the present invention, the passenger airbag is deployed from the passenger airbag door 200 of the crash pad 100 to the outside by the breakage of the base portion 300, the foam portion 600, and the skin portion 500 to protect the passenger in the passenger seat of the vehicle from impact.

Hereinafter, a method of manufacturing a crash pad according to another embodiment of the present invention will be described with reference to the drawings.

FIG. 12 is a flowchart illustrating a method of manufacturing a vehicle crash pad according to another embodiment of the present invention.

Referring to FIG. 12, first, the scrim 400 is insert-injected into the base portion 300 in the area of the passenger airbag door 200 of the crash pad 100 (S110).

Accordingly, the scrim 400 improves the robustness of the passenger airbag door 200.

In the scrim 400, the breaking holes 410 are formed at the positions corresponding to the first incision line 311 and the fourth incision line 314.

Before the breaking hole 410 is insert-injected into the base portion 300, the breaking hole 410 is broken at a position corresponding to a portion of the incision groove 310 in advance, and then the breaking hole 410 is insert-injected into the base portion 300.

The incision groove 310 is formed in the base portion 300 of the area of the passenger airbag door 200 (S120).

The incision groove 310 includes the first incision line 311 which extends in the width direction from the base portion 300, the second incision lines 312 which extend in the up-down direction from both ends of the first incision line 311, the third incision lines 313 which extend from both ends of the second incision line 312 toward the corners of the passenger airbag door 200, and the fourth incision lines 314 which connect the ends of the third incision line 313 to each other.

The incision groove 310 is formed in an overall X shape due to the third incision lines 313.

Therefore, due to the X-shaped incision grooves 310 formed in the base portion 300, the skin portion 500 and the foam portion 600 are easily torn by the shearing force caused by the damages of the airbag door even when the skin portion 500 and the foam portion 600 are not separately scored.

Then, after the base portion 300 is seated on a lower jig, the base portion 300 is fixed (S130).

In addition, in the base portion 300 fixed to the lower jig, an upper jig equipped with a trim knife is disposed above the area of the passenger airbag door 200 (S140).

Next, the trim knife punches along the incision groove 310 formed in the passenger airbag door 200 to form the plurality of punch holes 320 at predetermined positions (S150).

When the punch scoring that forms the punch hole 320 in the incision groove 310 by performing punching using the trim knife along the incision groove 310 as described above is applied, it is possible to prevent a protrusion from being formed on the exterior of the base portion 300.

Then, the skin portion 500 is mounted on an upper portion of a foam mold and the base portion 300 is mounted on a lower portion thereof (S160).

Here, a space having a width equal to the thickness of the foam portion 600 is formed between the skin portion 500 and the base portion 300.

Moreover, the foam portion 600 is formed between the skin portion 500 and the base portion 300 to complete the crash pad 100 of the present invention (S170).

The punch scoring according to another embodiment of the present invention can reduce costs compared to milling and laser scoring which are conventional scoring methods, shorten a processing time, and significantly shorten a manufacturing time of the passenger airbag door 200 of the crash pad 100.

Accordingly, the punch-scoring method according to another embodiment of the present invention can be expendably applied to injection-type and leather-wrapped type crash pads in addition to the foam-type scrim 400 to improve the quality of the exterior and reduce costs.

Hereinafter, a method of manufacturing a crash pad according to still another embodiment of the present invention will be described with reference to the drawings.

Figure 13A:
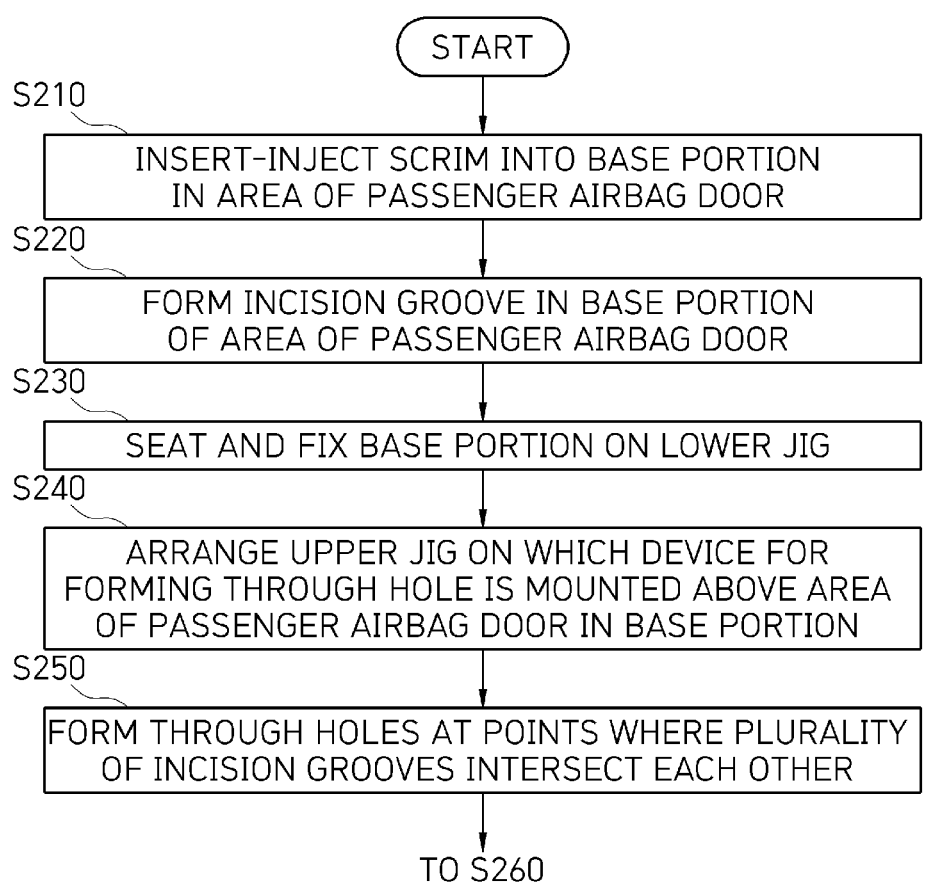
FIG. 13B is a flowchart illustrating a method of manufacturing the vehicle crash pad according to still another embodiment of the present invention.
Figure 13B:
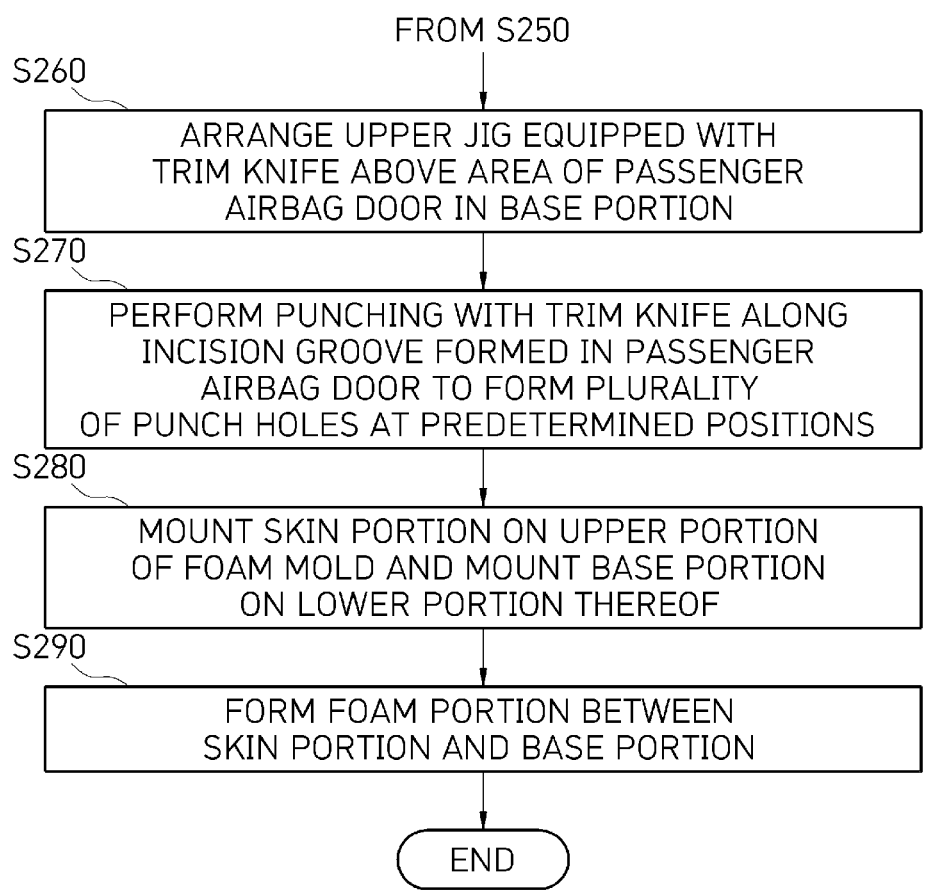

FIG. 13A and FIG. 13B is a flowchart illustrating a method of manufacturing a vehicle crash pad according to still another embodiment of the present invention.

Referring to FIG. 13A, first, the scrim 400 is insert-injected into the base portion 300 in the area of the passenger airbag door 200 of the crash pad 100 (S210).

Accordingly, the scrim 400 improves the robustness of the passenger airbag door 200.

In the scrim 400, the breaking holes 410 are formed at the positions corresponding to the first incision line 311 and the fourth incision line 314.

Before the breaking hole 410 is insert-injected into the base portion 300, the breaking hole 410 is broken at the position corresponding to a portion of the incision groove 310 in advance, and then the breaking hole 410 is insert-injected into the base portion 300.

The incision groove 310 is formed in the base portion 300 of the area of the passenger airbag door 200 (S220).

The incision groove 310 includes the first incision line 311 which extends in the width direction from the base portion 300, the second incision lines 312 which extend in the up-down direction from both ends of the first incision line 311, the third incision lines 313 which extend from both ends of the second incision line 312 toward the corners of the passenger airbag door 200, and the fourth incision lines 314 which connect the ends of the third incision line 313 to each other (as schematically show in FIG. 3A)

The incision groove 310 is formed in an overall X shape due to the third incision lines 313.

Therefore, due to the X-shaped incision grooves 310 formed in the base portion 300, the skin portion 500 and the foam portion 600 are easily torn by the shearing force caused by the damages of the airbag door even when the skin portion 500 and the foam portion 600 are not separately scored.

Then, after the base portion 300 is seated on a lower jig, the base portion 300 is fixed (S230).

In addition, in the base portion 300 fixed to the lower jig, an upper jig, on which a device for forming the through hole 330 is mounted, is disposed above the area of the passenger airbag door 200 (S240).

Next, the through holes 330 are formed at the points where the plurality of incision grooves 310 intersect each other (S250).

Specifically, the device for forming the through hole 330 forms the first through hole 331 to the third through hole 333 passing through the point where the first incision line 311 and the second incision line 312 are connected to each other, the point where the second incision line 312 and the third incision line 313 are connected to each other, and the point where the third incision line 313 and the fourth incision line 314 are connected to each other, in the plurality of incision lines.

In particular, the first through hole 331 is formed at the position at which the central axis C1 thereof is separated about 2.8 mm to 3.2 mm from the one surface of the first incision line 311 and the central axis C1 is separated about 2.8 mm to 3.2 mm from the other surface of the first incision line 311.

Moreover, the second through hole 332 is formed at the position at which the central axis C2 thereof is separated about 2.8 mm to 3.2 mm from the one surface of the second incision line 312 and the one surface of the third incision line 313 and the central axis C2 is separated about 2.8 mm to 3.2 mm from the other surfaces thereof.

In addition, the third through hole 333 is formed at the position at which the central axis C3 thereof is separated about 2.8 mm to 3.2 mm from the one surface of the fourth incision line 314 and the central axis C3 is separated about 3.8 mm to 4.2 mm from the other surface of the fourth incision line 314.

Accordingly, the through hole 330 forming device for forming the first through hole 331 to the third through hole 333 can be easily inserted at the point where the plurality of incision grooves 310 intersect each other.

Next, Referring to FIG. 13B, after removing the upper jig on which the through hole 330 forming device is mounted, the upper jig on which the trim knife is mounted is disposed above the area of the passenger airbag door 200 in the crash pad 100 fixed to the lower jig (S260).

Next, the trim knife performs punching along the incision groove 310 formed in the passenger airbag door 200 to form the plurality of punch holes 320 at predetermined positions (S270).

Specifically, the first through hole 331 is formed between the first punch line 321 and the second punch line forming the punch hole 320, the second through hole 332 is formed between the second punch line 322 and the third punch line 323 forming the punch hole 320, and the third through hole 333 is formed between the third punch line 323 and the fourth punch line 324 forming the punch hole 320.

When the punch scoring that forms the punch hole 320 in the incision groove 310 by performing punching using the trim knife along the incision groove 310 as described above is applied, it is possible to prevent a protrusion from being formed on the exterior of the base portion 300.

Then, the skin portion 500 is mounted on an upper portion of a foam mold and the base portion 300 is mounted on a lower portion thereof (S280).

Here, a space having a width equal to the thickness of the foam portion 600 is formed between the skin portion 500 and the base portion 300.

Moreover, the foam portion 600 is formed between the skin portion 500 and the base portion 300 to complete the crash pad 100 of the present invention (S290).

According to the present invention, when the passenger airbag is deployed, the passenger airbag door is broken in an overall X shape due to the third incision line of the incision groove. Therefore, the deployment time of the passenger airbag can be significantly shortened by the X-shaped incision grooves formed in the base portion.

Since the scrim is insert-injected and coupled to the base portion of the area of the passenger airbag door, the robustness of the passenger airbag door can be improved.

Since the punch hole is formed in the base portion by the punch scoring, the exterior of the base portion does not protrude to the outside, and thus, it is possible to improve the quality of the exterior of the base portion.

According to the through hole, it is possible to obtain the same effect as that of the punch hole at the point where the incision grooves intersect each other in the base portion.

The embodiments disclosed herein are directed to providing a vehicle crash pad capable of reinforcing rigidity of a passenger airbag door, enabling a passenger airbag to be easily deployed, improving an appearance quality of the passenger airbag door, and reducing a cost of manufacturing the crash pad.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle crash pad coupled to a passenger airbag door having a passenger airbag installed in a passenger seat direction, the vehicle crash pad comprising:
   a base portion forming a frame;
   a scrim coupled to an inside of the base portion of the passenger airbag door in an insert-injection method;
   a skin disposed above the base portion and having a surface exposed to an outside;
   a foam disposed between the base portion and the skin; and
   incision grooves formed in a rear surface of the base portion in an area of the passenger airbag door, wherein the incision grooves include:
      a first incision line extending in a width direction of the base portion formed in the area of the passenger airbag door;
      second incision lines extending in a height direction from both ends of the first incision line;
      third incision lines extending from both ends of the second incision lines toward a respective corner of the passenger airbag door; and
      fourth incision lines extending in the height direction and the width direction from ends of the third incision lines to connect respective ends of the third incision lines to each other.

2. The vehicle crash pad of claim 1, wherein the base portion is made of any one or any combination of polypropylene and polyurethane.

3. The vehicle crash pad of claim 1, wherein the incision groove is configured to allow the passenger airbag door to be broken by a deployment pressure of the passenger airbag, in response to the passenger airbag being deployed.

4. The vehicle crash pad of claim 1, wherein lengths of the second incision lines are smaller than lengths of the first incision line and the third incision lines.

5. The vehicle crash pad of claim 1, wherein, in response to the passenger airbag being deployed, the first incision line, the second incision lines, the third incision lines, and the fourth incision lines are broken by a deployment pressure of the passenger airbag, and the passenger airbag is deployed between the first incision line, the second incision lines, and the third incision lines.

6. The vehicle crash pad of claim 1, wherein a thickness of the foam is in a range of 4 mm to 5 mm.

7. The vehicle crash pad of claim 1, wherein the incision grooves are arranged to form an X-shape.

8. The vehicle crash pad of claim 1, wherein the base portion further includes a plurality of punch holes formed by punch scoring provided therein, the plurality of punch holes, including:
   a first punch-line formed at a first position corresponding to the first incision line;
   second punch-lines formed at second positions corresponding to the second incision lines;
   third punch-lines formed at third positions corresponding to the third incision lines; and
   fourth punch-lines formed at fourth positions corresponding to the third incision lines and the fourth incision lines.

9. The vehicle crash pad of claim 8, wherein the first punch-line includes a plurality of first punch-line holes.

10. The vehicle crash pad of claim 8, wherein the third punch-lines extend from ends of the second punch-lines.

11. The vehicle crash pad of claim 8, wherein the base portion further includes a plurality of through holes formed therein, the plurality of through holes, including:
   a first through hole formed at a fifth position between the first punch-line and a respective second punch-line;
   second through holes formed at sixth positions between the respective second punch-lines and respective third punch-lines; and
   third through holes formed at seventh positions between the respective third punch-lines and respective fourth-punchlines.

12. The vehicle crash pad of claim 1, wherein the base portion further includes a plurality of through holes formed therein, the plurality of through holes including:
   a first through hole formed at a first position corresponding to a first point at which the first incision line and a respective second incision line connect;
   second through holes formed at second positions corresponding to a second point where respective second incision lines and respective third incision lines connect; and
   third through holes formed at third positions corresponding to a third point where the third incision lines and respective fourth incision lines connect.

13. The vehicle crash pad of claim 1, wherein the scrim includes a plurality of breaking holes formed therein, the plurality of breaking holes including:
   a first breaking hole formed at a first position corresponding to the first incision line; and
   second breaking holes formed at second positions corresponding to corners where respective fourth incision lines are provided, wherein the second breaking holes are formed to extend in the height direction and the width direction.

14. A vehicle crash pad coupled to a passenger airbag door having a passenger airbag installed in a passenger seat direction, the vehicle crash pad comprising:
   a base portion forming a frame; and
   a scrim coupled to an inside of the base portion of the passenger airbag door in an insert-injection method; and incision grooves formed in a rear surface of the base portion in an area of the passenger airbag door, wherein the incision grooves are configured to include:
- a first incision line extending in a width direction of the base portion formed in the area of the passenger airbag door;
- second incision lines extending in a height direction from both ends of the first incision line;
- third incision lines extending toward a respective corner of the passenger airbag door from both ends of the second incision lines; and
- fourth incision lines extending from ends of the third incision lines to connect respective ends of the third incision lines to each other; and wherein the scrim comprises a first breaking hole formed in a width direction of the passenger airbag door, and a second breaking hole forming an L-shape in the height direction and the width direction in a corner area of the passenger airbag door.

15. The vehicle crash pad of claim 14, wherein the first breaking hole is formed at a position corresponding to the first incision line, and
wherein the second breaking hole is formed at a position corresponding to the fourth incision lines.

16. The vehicle crash pad of claim 14, wherein the scrim is broken along the first breaking hole and the second breaking hole, in response to the passenger airbag being deployed.

17. The vehicle crash pad of claim 14, wherein the incision grooves are arranged to form an X-shape.

* * * * *